(12) United States Patent
Ikeda et al.

(10) Patent No.: US 9,150,115 B2
(45) Date of Patent: Oct. 6, 2015

(54) WIRE ROUTING DEVICE

(75) Inventors: Tomohiro Ikeda, Kakegawa (JP); Ryuta Takishita, Kakegawa (JP); Yukihisa Kikuchi, Kakegawa (JP); Masaru Imai, Kakegawa (JP); Keizo Aoki, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 126 days.

(21) Appl. No.: 13/541,931

(22) Filed: Jul. 5, 2012

(65) Prior Publication Data
US 2013/0010449 A1 Jan. 10, 2013

(30) Foreign Application Priority Data

Jul. 5, 2011 (JP) ................................ 2011-149378

(51) Int. Cl.
| | |
|---|---|
| B60L 11/18 | (2006.01) |
| H02G 3/04 | (2006.01) |
| H01M 2/20 | (2006.01) |
| H01M 10/48 | (2006.01) |
| H01M 2/10 | (2006.01) |

(52) U.S. Cl.
CPC ........... *B60L 11/1879* (2013.01); *H01M 2/206* (2013.01); *H01M 10/482* (2013.01); *H02G 3/0437* (2013.01); *H01M 2/1077* (2013.01); *Y02T 10/705* (2013.01); *Y02T 10/7005* (2013.01)

(58) Field of Classification Search
CPC . H02G 3/0437; H01M 10/482; H01M 2/1077
See application file for complete search history.

(56) References Cited

U.S. PATENT DOCUMENTS

| | | | | |
|---|---|---|---|---|
| 5,729,436 | A * | 3/1998 | Yoshigi et al. | 361/752 |
| 6,261,719 | B1 | 7/2001 | Ikeda et al. | |
| 6,383,014 | B1 * | 5/2002 | Saito et al. | 439/456 |
| 6,428,364 | B2 * | 8/2002 | Saito et al. | 439/736 |
| 6,544,077 | B2 * | 4/2003 | Ikeda | 439/736 |
| 7,229,320 | B2 * | 6/2007 | Saito et al. | 439/627 |
| 2012/0015550 | A1 | 1/2012 | Ikeda et al. | |

(Continued)

FOREIGN PATENT DOCUMENTS

| | | |
|---|---|---|
| JP | 2000149909 A | 5/2000 |
| JP | 2010170884 A | 8/2010 |

(Continued)

OTHER PUBLICATIONS

Office Action dated Oct. 29, 2014 issued by The State Intellectual Property Office of The People's Republic of China in counterpart Application No. 201210232355.4.

(Continued)

*Primary Examiner* — Timothy Thompson
*Assistant Examiner* — Krystal Robinson
(74) *Attorney, Agent, or Firm* — Sughrue Mion, PLLC

(57) ABSTRACT

A wire routing device includes a wire housing part, a terminal housing chamber part, and a plurality of wire lead-out parts. The terminal housing chamber part includes a plurality of terminal housing chambers. Each of the wire lead-out parts couples one of the housing grooves with one of the terminal housing chambers. Each of wire surplus length absorption spaces is formed inside of a substantially rectangle abcd defined by a section bc of an outer wall of the voltage detection wire housing part located at a side of the terminal housing chamber and a section ad of a wall of the housing groove which faces the section bc, which are cut by a line ab and a line cd.

5 Claims, 7 Drawing Sheets

(56) References Cited

U.S. PATENT DOCUMENTS

| | | |
|---|---|---|
| 2012/0164509 A1 | 6/2012 | Ogasawara et al. |
| 2012/0183833 A1 | 7/2012 | Ikeda et al. |
| 2013/0178091 A1 | 7/2013 | Ogasawara et al. |

FOREIGN PATENT DOCUMENTS

| | | | |
|---|---|---|---|
| JP | 2010251052 A | 11/2010 | |
| JP | 20118955 A | 1/2011 | |
| JP | 20118957 A | 1/2011 | |
| JP | 201170846 A | 4/2011 | |
| JP | 201177031 A | 4/2011 | |
| JP | 2011228218 A | 11/2011 | |
| WO | 2011021614 A1 | 2/2011 | |
| WO | 2011037268 A2 | 3/2011 | |

OTHER PUBLICATIONS

Communication issued on May 21, 2015 by The State Intellectual Property Office of PR China in related Application No. 201210232355.4.

Office Action dated Jun. 23, 2015 issued by the Japanese Intellectual Property Office in counterpart Japanese Application No. 2011-149378.

* cited by examiner

WIRE ROUTING DEVICE

BACKGROUND

The present disclosure relates to a wire routing device that is applied to a battery mounted in an electric vehicle, and more particularly to a wire routing device in which a work for providing a surplus length to a voltage detection wire is not troublesome.

<Wire Routing Device Disclosed in JP-A-2010-170884>

In the wire routing device for use in the electric vehicle having a battery mounted therein, there has been known that a wire surplus length absorption part is formed in an electric wire on each voltage detection terminal side (refer to JP-A-2010-170884).

FIGS. 7A and 7B are diagrams of the wire routing device disclosed in JP-A-2010-170884, in which FIG. 7A is a perspective view of the overall wire routing device, and FIG. 7B is a partial plan view illustrating a state where first hinges and second hinges are non-deformed in the wire routing device of FIG. 7A. Referring to FIG. 7A, reference numeral 100 denotes a bus module, 102 is a battery assembly, 103 is batteries, 106 is busbars, 107 is terminals, 111 is a plate, 112 is first housing parts, 113 is first hinges (first pitch adjusting units), 114 is second housing parts, 115 is second hinges (second pitch adjusting units), 116 is covers, 117 is hinges, 118 (FIG. 7B) is fixing parts, 120 is a wire housing part, 126 is third housing parts, 127 is a thermistor housing part, 131 and 132 are electrodes, and 180 is electric wires. The busbar module (wire routing device) 100 disclosed in JP-A-2010-170884 includes a plurality of the first housing parts 112 that house the respective busbars 106 and the respective terminals 107, and are aligned along a longitudinal direction of the battery assembly, a plurality of the second housing parts 114 that house the electric wires 180, and is aligned along the longitudinal direction, and a plurality of third housing parts 126 that house connection portions of the electric wire 180 and the terminals 107. The busbar module (wire routing device) 100 also includes the first hinges 113 that couple the adjacent first housing parts 112 with each other, the second hinges 115 that couple the adjacent second housing parts 114 with each other, and plural pairs of the wire fixing ribs 118 (FIG. 7B) that are paired and arranged so as to position the second hinges 115 therebetween, and fix the electric wires 180. Each of the electric wires 180 is formed with a length extending from one end of the plate 111 extended at a maximum to each of the third housing parts 126.

In this device, in order to deal with a lamination tolerance of a battery cell appearing in the longitudinal direction, and a cutoff tolerance of the electric wire, there is a need to provide a surplus length to each electric wire 180 in advance. The wire fixing ribs 118 are disposed on both sides of the second hinges 115 which are arranged on the second wire housing parts 114 at given intervals to fix each electric wire 180.

The second hinges 115 are expanded and contracted to absorb the variability of battery pitches. However, in order to prevent the electric wires 180 from being tightly stretched when the second hinges 115 are expanded, each electric wire 180 is sagged between the wire fixing ribs 118 in advance as illustrated in FIG. 7B. Conversely, even when the second hinges 115 are contracted, each electric wire 180 is held by the wire fixing ribs 118, to thereby prevent the electric wire 180 from being excessively bent or catching on another component.

<Wire Routing Device Disclosed in JP-A-2011-70846>

Also, there has been known a resin molded wire routing device having a wire housing part, terminal housing chambers, and a wire lead-out part. In the wire housing part, a plurality of elongated housing grooves are formed between two elongated walls erected at an interval where the electric wire can be inserted, the grooves are divided at a plurality of places in a longitudinal direction, and the respective ends of the divided grooves are coupled with each other by elastic coupling members. The terminal housing chambers each house a voltage detection terminal made of an electrically conductive metal which connects a positive or negative terminal of a battery to a negative or positive terminal of an adjacent battery. A plurality of the terminal housing chambers is spaced apart from each other along the longitudinal direction of the wire housing part. The spaced and adjacent terminal housing chambers are coupled with each other by an elastic coupling member. The wire lead-out part couples one of the housing grooves with one of the terminal housing chambers to internally lead out the electric wire from the terminal housing chambers to the housing grooves (refer to JP-A-2011-70846).

<Problems With the Invention Disclosed in JP-A-2010-170884>

In the wire routing device disclosed in JP-A-2010-170884, a dimension of the electric wire extended from the device to the external is stabilized by winding a tape around the electric wire on a tongue-shaped resin, or fixing the electric wire to the tongue-shaped resin with a band at a part A in FIG. 7A. However, when the dimension of the electric wire extended to the external is as extremely short as the tongue cannot be fitted to the electric wire from the viewpoint of layout, the dimension of the electric wire cannot be stabilized.

Also, the electric wire must be loosened for each of the wire fixing parts disposed at the given intervals, and a work for providing a surplus length to the electric wire is troublesome.

Further, the excess absorption part is required for each of the hinges, and the loosened electric wire interferes with another electric wire to increase a routing space.

<Problems With the Invention Disclosed in JP-A-2011-70846>

In the wire routing device disclosed in JP-A-2011-70846, the slight wire surplus length absorption space is structurally provided. However, the wire surplus length absorption space is not intentionally formed, and therefore is spatially insufficient.

Also, a crimping portion of the voltage detection terminal is pushed directly against a resin wall, resulting in a risk that the crimping portion is deformed.

SUMMARY

The present disclosure has been made to solve the above-mentioned drawbacks, and aims at providing a wire routing device that requires no work for loosening an electric wire for each of wire fixing parts, reduces a routing space without allowing a loosened electric wire to interfere with another electric wire, and has no risk that a crimping portion of a voltage detection terminal is deformed.

(1) In order to solve the above problems, according to a first aspect of the present disclosure, there is provided a wire routing device comprising:

a wire housing part;

a terminal housing chamber part; and a plurality of wire lead-out parts, wherein the wire housing part, the terminal housing chamber part and wire lead-out parts are made of insulative material;

wherein the wire housing part includes a plurality of housing grooves, each of the housing grooves is formed between two elongated walls erected at an interval, the wire housing part is divided at a plurality of places in an extending direction of the wire housing part, and respective ends of the divided housing grooves are coupled with each other by elastic coupling members;

wherein the terminal housing chamber part includes a plurality of terminal housing chambers which are arranged in a first direction, the terminal housing chambers are coupled with each other by elastic coupling members;

wherein each of the terminal housing chambers houses an electrically conductive metal plate which connects a positive terminal of a battery to a negative terminal of an adjacent battery adjacent to the battery;

wherein each of the wire lead-out parts couples one of the housing grooves with one of the terminal housing chambers and has a right side wall and left side wall to lead out a voltage detection wire connected to a voltage detection terminal in the terminal housing chamber to the corresponding housing groove;

wherein the wire housing part has a plurality of wire surplus length absorption spaces; and wherein each of the wire surplus length absorption spaces is formed inside of a substantially rectangle abcd defined by a section bc of an outer wall of the voltage detection wire housing part located at a side of the terminal housing chamber and a section ad of a wall of the housing groove which faces the section bc, which are cut by a line ab extending from the left side wall of the wire lead-out part in a second direction perpendicular to the first direction, and a line cd extending from a right side wall of a wire lead-out part corresponding to a terminal housing chamber which is adjacent to left side of the terminal chamber corresponding to the wire lead-out part in the second direction.

For example, a crimping portion is formed so as to be extended from a part of the voltage detection terminal, and an end of the voltage detection wire is crimped by the crimping portion, and a round protrusion is provided at a region which is located at a tip end of one of the two elongated walls forming the wire lead-out part and located far from the terminal housing chamber than the crimping portion.

According to the above description, the electric wire is routed from the connector side, and the surplus length of the electric wire can be bent and housed in the wire surplus length absorption space. As a result, the sufficiently long dimension of the electric wire is obtained, and no work for loosening the electric wire for each of the wire fixing parts is required, the routing space is reduced without allowing the loosened electric wire to interfere with another electric wire, and the routing work becomes simple.

Also, since not the crimping portion but the flexible electric wire is abutted against the round protrusion, the crimping portion can be prevented from being pushed against the resin wall and deformed.

BRIEF DESCRIPTION OF THE DRAWINGS

The above objects and advantages of the present disclosure will become more apparent by describing in detail preferred exemplary embodiments thereof with reference to the accompanying drawings, wherein:

FIGS. 2A and 2B are plan views illustrating a state in which electric wires are routed in the wire routing device of FIG. 1, in which FIG. 2A illustrates a state in which a cover is opened, and FIG. 2B illustrates a state in which the cover is closed.

FIGS. 7A and 7B are diagrams illustrating a wire routing device disclosed in JP-A-2010-170884, in which FIG. 7A is a perspective view of the overall wire routing device, and FIG. 7B is a partial plan view of first hinges and second hinges in a state where the device of FIG. 7A is non-deformed.

DETAILED DESCRIPTION OF EXEMPLARY EMBODIMENTS

Hereinafter, a description will be given of a wire routing device that is a useful for a lithium ion battery, can stabilize a dimension of an electric wire extended to the external even if the dimension of the electric wire extended to the external is small, and the electric wire cannot be fixed by a band or a tape, requires no work for loosening the electric wire for each of wire fixing parts, reduces a routing space without allowing a loosened electric wire to interfere with another electric wire, and has no risk that a crimping portion of a voltage detection terminal is deformed, with reference to the accompanying drawings.

<Wire Routing Device Intended for the Present Disclosure>

Figure 1:
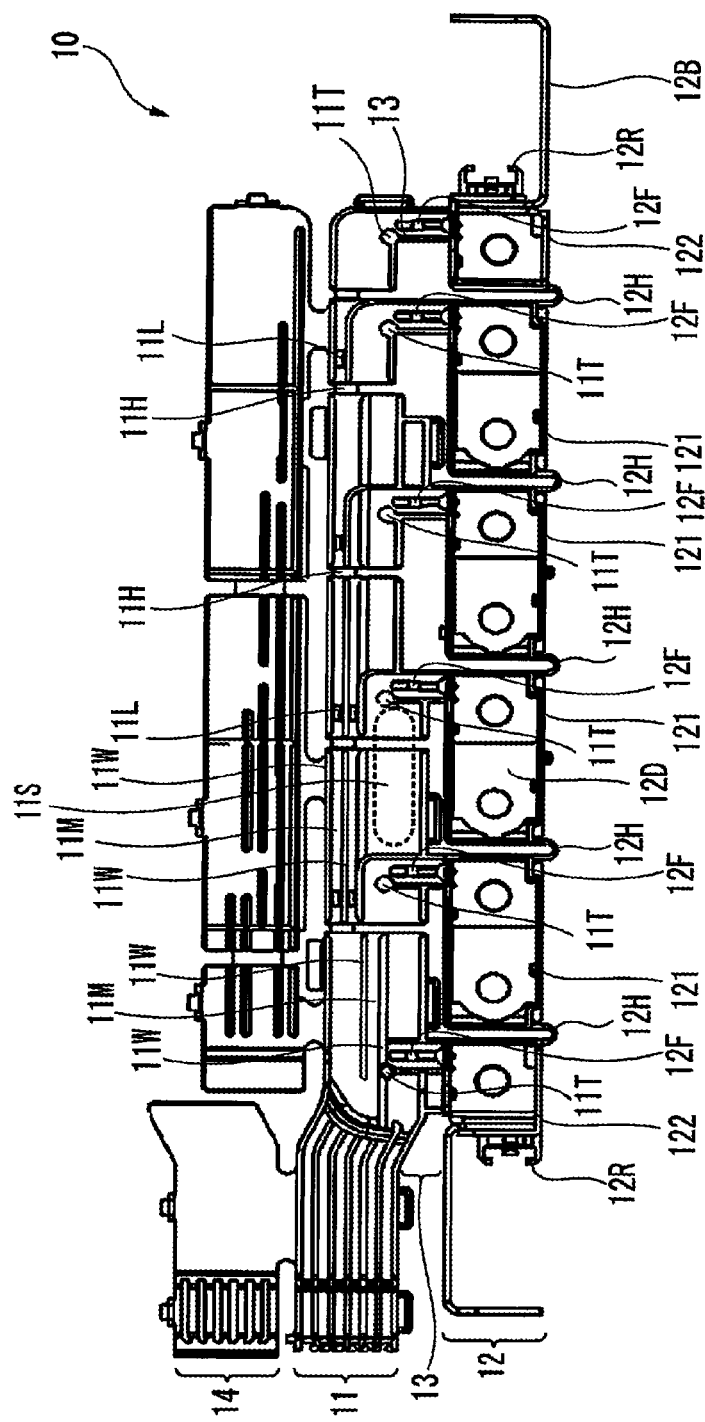
FIG. 1 is a plan view illustrating a wire routing device according to the present disclosure before electric wires are routed.

FIG. 1 is a plan view illustrating a wire routing device according to the present disclosure before electric wires are routed.

Figure 2:
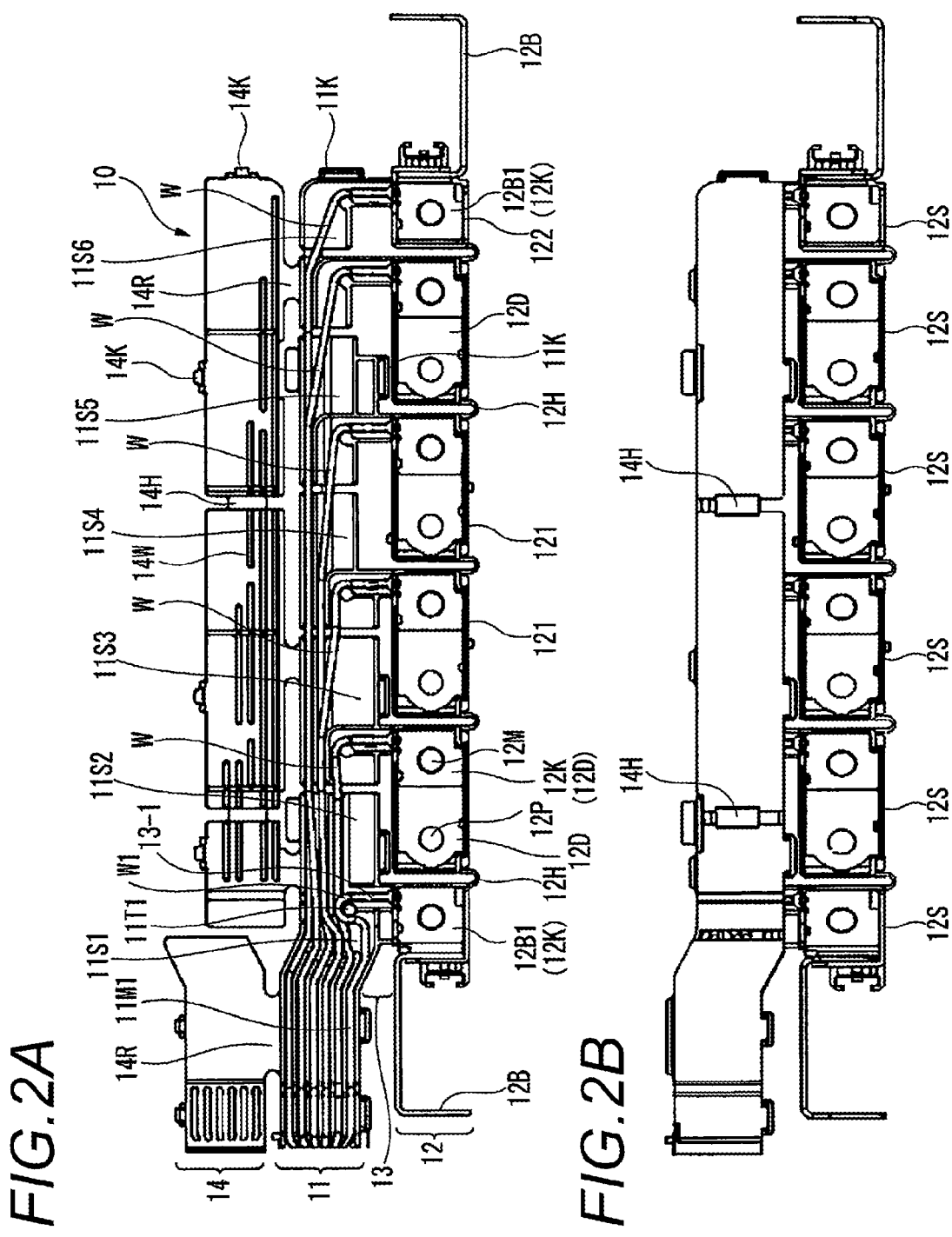

FIGS. 2A and 2B are plan views illustrating a state in which electric wires are routed in the wire routing device of FIG. 1, in which FIG. 2A illustrates a state in which a cover is opened, and FIG. 2B illustrates a state in which the cover is closed.

First, referring to FIG. 1, a wire routing device 10 is entirely molded with resin, and includes a voltage detection wire housing part 11, a terminal housing chamber part 12 that houses battery terminals therein, a voltage detection wire lead-out part 13 that couples the voltage detection wire housing part 11 with the terminal housing chamber part 12, and a cover 14.

The present disclosure has two features. Before describing those features, a description will be first given in brief of the voltage detection wire housing part 11, the terminal housing chamber part 12, the voltage detection wire lead-out part 13, and the cover 14 of the wire routing device 10 intended for the present disclosure.

<Purpose of Voltage Detection Wire Housing Part 11>

In the case of a lithium ion battery, a voltage detection wire is led out from each cell of the lithium ion battery, and led to a connector, and then connected to a common voltage detection resistive element mounted on a printed circuit board through the connector in time division. Currents in the respective voltage detection wires are compared with each other by a CPU to compare voltages across the respective cells in each lithium ion battery with each other, and it is monitored whether there is an abnormal cell, or not.

In order to achieve the above purpose, a large number of voltage detection wires corresponding to the number of cells are required. Accordingly, in order to prevent the respective electric wires from contacting with each other so as to be short-circuited, in the related-art device, there is a need to cover the respective electric wires with a protective material such as a corrugated tube or a tube, and fixedly bundle the entire covered electric wires with a tape or a band. On the other hand, the present disclosure does not conduct the above arrangement at all, and presupposes that the voltage detection wire housing part configured as described below is provided. With the provision of such a voltage detection wire housing part, no work for covering the respective electric wires with the protective material such as a corrugated tube or a tube is required, and there is also no need to fixedly bundle the entire covered electric wires with the tape or the band.

<Configuration of Voltage Detection Wire Housing Part 11>

The voltage detection wire housing part 11 is configured to install the respective voltage detection wires W (FIG. 2A) led out of the respective batteries in parallel to each other without contacting with each other till the connector led to a terminal block, and forms a large number of walls 11W in parallel to each other along the alignment of the batteries between the respective batteries and the connector to form wire routing grooves 11M between the respective walls 11W. The walls 11W are set to be high in height so that the wire routing grooves 11M formed between the respective walls 11W are deepened. A plurality of the voltage detection wires W are housed vertically in each of the wire routing grooves 11M, as a result of which the number of wire routing grooves 11M is reduced so as to downsize a width size of the voltage detection wire housing part 11 in a direction crossing the wire routing grooves.

The above wire routing grooves 11M are not continuous grooves that are straightly led from the respective batteries to the connector. The groove is divided for each of the batteries, and front and rear portions of each divided groove are coupled with each other by an elastic coupling member 11 H made of the same resin and formed into a U-shape to provide a hinge function having elasticity of the resin material per se. The wire routing groove 11M is thus divided once for each of the batteries, and front and rear side walls of each divided groove are coupled with each other by the elastic coupling member 11 H to form a battery pitch tolerance absorption part. Therefore, even if there is a tolerance of the battery pitch in the respective batteries, the tolerance is absorbed by the battery pitch tolerance absorption part. As a result, no stress is exerted on any portion of the voltage detection wire housing part 11, and the tough voltage detection wire housing part 11 that withstands a long use is obtained.

Further, a given interval is formed between both of the walls 11W to form a wire lock 11L described below.

<Wire Lock 11L>

The wire lock 11L is a protrusion that is disposed in an uppermost part of each wall 11W, and tapered so that the respective walls 11W are spaced away from each other toward above. The Wire lock 11L is thus formed by the tapered protrusion so that each voltage detection wire W is smoothly housed in the wire routing groove 11M. Moreover, each voltage detection wire W that has been housed in the wire routing groove 11M once is sandwiched between those protrusions so as not to float from the groove.

<Terminal Housing Chamber Part 12>

The terminal housing chamber part 12 is configured so that a plurality (four in the drawing) of terminal housing chambers 121 each shaped into a rectangular box having an upper surface opened are continuous to each other, and terminal housing chambers 122 each shaped into a square having an upper surface opened are continuous to both ends of those terminal housing chambers 121.

Each of the terminal housing chambers 121 has a bottom formed with a positive terminal hole through which a positive terminal of a battery penetrates, and a negative terminal hole through which a negative terminal of an adjacent battery penetrates. Also, the terminal housing chambers 122 on both ends thereof each have a bottom formed with only the positive terminal hole through which the positive terminal of the battery penetrates or the negative terminal hole of the battery through which the negative terminal of the battery penetrates.

Also, in the related-art device, each terminal housing chamber and an adjacent terminal housing chamber are coupled with each other. On the other hand, in this example, each terminal housing chamber 121 and an adjacent terminal housing chamber 121, and each terminal housing chamber 121 and an adjacent terminal housing chamber 122 are each spaced apart from each other at a given interval, and coupled with each other by an elastic coupling member 12H made of the same resin to provide the hinge function having the elasticity of the resin material per se.

The intervals between each terminal housing chamber 121 and an adjacent housing chamber 121 or 122 can be adjusted by the hinge function (contraction/expansion) of the elastic coupling member 12H. Therefore, even if there is a tolerance of the battery pitch, the tolerance can be absorbed by the elastic coupling member 12H.

A busbar 12D (FIG. 2A) to be described below is housed on a bottom of each terminal housing chamber 121, and a voltage detection terminal 12K that is half the size of the busbar 12D is housed on the busbar 12D.

<Busbar 12D of Each Terminal Housing Chamber 121>

Referring to FIG. 2A, the busbar 12D in each terminal housing chambers 121 is formed of an electrically conductive metal plate having a substantially rectangular shape which is housed on the overall bottom of the terminal housing chambers 121. In a state where the busbar 12D is housed in each terminal housing chamber 121, the busbar 12D is formed with a through-hole 12P through which the positive terminal of the battery, which has penetrated through the positive terminal hole in the bottom of the terminal housing chambers 121, further penetrates, and a through-hole 12M through which the negative terminal of the adjacent battery, which has penetrated through the negative terminal hole in the bottom of the terminal housing chambers 121, further penetrates. With the above configuration, the busbar 12D is housed on the overall bottom of the terminal housing chambers 121, and the positive terminal of the battery is allowed to pass through the through-hole 12P of the busbar 12D. Also, the negative terminal of the adjacent battery is allowed to pass through the through-hole 12M of the busbar 12D, and the respective terminals are fastened by nuts to form a cascade circuit of each battery and an adjacent battery by the busbar 12D.

<Voltage Detection Terminal 12K>

Each voltage detection terminal 12K is an electrically conductive metal plate having a substantially square shape which is housed on half of the bottom of terminal housing chamber 121 and the bottom of the terminal housing chamber 122. The voltage detection terminal 12K is placed on one terminal hole (12P or 12M) of the busbar 12D housed on the bottom of each terminal housing chamber 121, and on one terminal hole of the square busbar 12D housed on the bottom of the terminal housing chamber 122. The voltage detection terminal 12K is formed with a through-hole 12Q through which the battery terminal, which has penetrated through the through-hole of the busbar 12D, further penetrates. Also, a crimping portion 12F is extended from one corner of the square voltage detection terminal 12K, and an end of the voltage detection wire W is swaged to the crimping portion 12F.

<Function of Busbar 12D as Voltage Detection Terminal 12K>

When the crimping portion 12F is extended from one corner of the substantially rectangular busbar 12D, the busbar 12D also functions as the voltage detection terminal 12K, and the voltage detection terminal 12K can be omitted.

<Busbar 12D of Each Terminal Housing Chamber 122>

On the other hand, polarity fastening parts 12B1 of a total positive and negative busbars 12B, which will be described later, are allowed to function as the busbars housed on the bottom of the square terminal housing chambers 122, and the busbars are omitted.

A connection busbar with an adjacent module or an external device is placed on the other end (total positive and negative extraction part) of each total positive and negative busbar 12B, and totally fastened by a bolt (to be described later).

Figure 3:
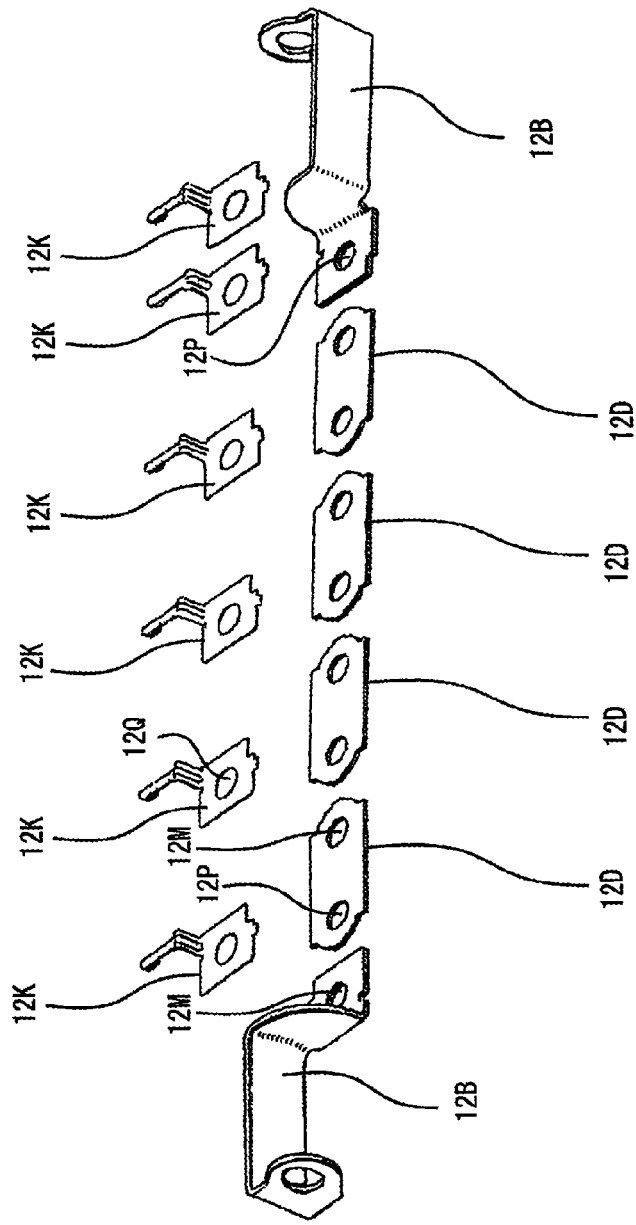
FIG. 3 is a perspective view illustrating two total positive and negative busbars, four busbars, and six voltage detection terminals, which are housed within the terminal housing chambers.

FIG. 3 is a perspective view illustrating a layout relationship of the two total positive and negative busbars 12B, the four busbars 12D, and the six voltage detection terminals 12K, which are housed within the terminal housing chambers 121 and 122 as described above, with the exception of the terminal housing chambers 121 and 122. Referring to FIG. 3, the two total positive and negative busbars 12B are arranged on both ends thereof, and the four busbars 12D are arranged between the total positive and negative busbars 12B. The respective six voltage detection terminals 12K are placed on the two total positive and negative busbars 12B and the four busbars 12D.

<Wire Lead-Out Part 13>

In order to lead out the voltage detection wire for each cell of the lithium ion battery, the respective voltage detection wire lead-out parts 13 (refer to 13-1 to 13-6 in FIG. 4) are formed between the voltage detection wire housing part 11 and the terminal housing chambers 121, 122 where the voltage detection wires W are wired (FIG. 2A).

The voltage detection wire lead-out part 13-1 (FIG. 2A) of the terminal housing chamber 122 closest to a connector (connected to the left side in the figure although being omitted) among the plurality of terminal housing chambers 121 and 122 allows a voltage detection wire W1 routed in a wire routing groove 11M1 (FIG. 2A) closest to the terminal housing chamber part 12 side among the plurality of wire routing grooves 11M to pass therethrough. The voltage detection wire lead-out part 13 of the subsequent terminal housing chambers 121 allows the voltage detection wire W routed in the second closer wire routing groove 11M to pass therethrough. The same arrangement is repeated. The voltage detection wire lead-out part 13 of the terminal housing chambers 122 (right side in the figure) farthest from the connector allows the voltage detection wire W routed in the farthest wire routing grooves 11M (uppermost wire routing groove in the figure) to pass therethrough. The adjacent voltage detection wires W are routed in one wire routing groove 11M so as to downsize the device. Thus, the voltage detection wires W are routed from the respective terminal housing chambers 121 and 122 to the respective wire routing grooves 11M through the voltage detection wire lead-out part 13.

<Cover 14>

The cover 14 is configured to cover the voltage detection wire housing part 11. The cover 14 is led to the voltage detection wire housing part 11 through elastic coupling parts 14R (FIG. 2A) each having the hinge function formed at a plurality of locations (three locations in FIG. 2A). The cover 14 is line-symmetric with the voltage detection wire housing part 11 about the elastic coupling parts 14R in principle. The cover 14 is divided at several locations in the longitudinal direction, and the adjacent divided pieces are coupled with each other by an elastic coupling member 14H made of the same resin to provide the hinge function having the elasticity of the resin material per se. With the above configuration, the cover 14 is also formed with the battery pitch tolerance absorption part.

Also, the cover 14 is formed with ribs 14W for reinforcing the cover 14 at several locations. Also, an edge of the cover 14 is formed with locking pieces 14K at several locations (five locations in the figure). Locking holes 11k are likewise formed in an edge of the voltage detection wire housing part 11 in correspondence to the locking pieces 14K of the cover 14 when the cover 14 is folded at the elastic coupling parts 14R. Therefore, when the cover 14 is folded at the elastic coupling parts 14R, the respective locking pieces 14K on the edge of the cover 14 are fitted into the respective locking holes 11k in the edge of the voltage detection wire housing part 11, and the cover 14 completely covers the voltage detection wire housing part 11 as illustrated in FIG. 2B, so as to be hardly detached from the voltage detection wire housing part 11. In this case, the above-mentioned ribs 14W are fitted between the adjacent parallel walls 11W of the voltage detection wire housing part 11 to reinforce the cover 14.

<Routing of Electric Wires into Wire Routing Device>

A configuration in which the voltage detection wires W are routed to the wire routing device 10 in FIG. 1 as described above is illustrated in the plan view of FIG. 2A, and a configuration in which the cover 14 is closed is illustrated in the plan view of FIG. 2B.

Referring to FIG. 2A, the voltage detection wires W are housed one by one or two by two in the wire routing grooves 11M from the respective terminal housing chambers 121 and 122 through the respective voltage detection wire lead-out parts 13. The voltage detection wires W are wired to the connector side (left side) through the side walls formed in parallel to each other.

<Installation of Battery to Wire Routing Device 10 in FIG. 2B>

When the wire routing device 10 in FIG. 2B is installed to a large number of batteries, the rectangular batteries each having the positive terminal and the negative terminal are first aligned in parallel to each other. In this situation, a positive terminal of each battery comes close to a negative terminal of an adjacent battery, and the negative terminal of each battery comes close to the positive terminal of an adjacent battery. The positive terminal of each battery is allowed to penetrate through the positive terminal through-hole 12P of the busbar 12D housed on the bottom of each terminal housing chamber 121 in the terminal housing chamber part 12. The negative terminal of the adjacent battery is allowed to penetrate through the negative terminal through-hole 12M of the busbar 12D and the through-hole 12Q of the voltage detection terminal 12K placed on the negative terminal through-hole 12M. Then, the positive terminal and the negative terminal are fitted and fastened with a nut. With the above configuration, the positive terminal of each battery and the negative terminal of the adjacent battery are electrically connected by the busbar 12D, and the negative terminal of the adjacent battery and the voltage detection wire W are electrically connected by the voltage detection terminal 12K.

The same operation is repeated between a positive terminal of the above-mentioned adjacent battery having the negative terminal, which is adjacent to the above-mentioned battery having the positive terminal, and a negative terminal of an adjacent battery with respect to the terminals of all the batteries.

Further, the same operation is repeated between a positive terminal of each battery on a side of a positive terminal of an adjacent battery, which is adjacent to a negative terminal of the above-mentioned battery, and a negative terminal of an adjacent battery.

With the above operation, all of the batteries are finally connected in series by the respective busbars 12D.

A terminal of a first battery among the cascaded batteries configures a total positive terminal or a total negative terminal, and a terminal of a last battery configures a total negative terminal or a total positive terminal (hereinafter both of those terminals are called total positive and negative terminals as a whole without any distinction).

One end of those two total positive and negative terminals are housed in the terminal housing chambers 122 on both ends of the terminal housing chamber part 12, and the voltage detection terminals 12K are placed on those total positive and negative terminals, and fastened by nuts. The connection busbar with the adjacent module or the external device is placed on the other end (total positive and negative extraction parts) of each of total positive and negative busbars 12B, and fastened by a bolt.

The present disclosure has the following two features in the above-mentioned wire routing device 10.

<Feature 1 of the Present Disclosure: Wire Surplus Length Absorption Spaces 11S>

In the related technique disclosed in JP-A-2011-70846, each wire routing groove is formed in a narrow linear space extended to the vicinity of the target voltage detection terminal, and the electric wire housed in the wire routing groove is linearly routed to the vicinity of the voltage detection terminal. As a result, there is no margin for absorbing the surplus length.

On the contrary, according to the present disclosure, wire surplus length absorption spaces 11S for absorbing a surplus length of the electric wires are disposed for the respective electric wires (that is, one by one in the vicinity of the respective voltage detection wire lead-out parts 13), the entire variability of the cut tolerance and the battery pitch can be absorbed by the wire surplus length absorption spaces 11S.

<Wire Surplus Length Absorption Spaces 11S>

The wire surplus length absorption spaces 11S according to the present disclosure will be described with reference to FIG. 4.

Wire surplus length absorption spaces 11S1 to 11S6 each represent an inner area surrounded by a rectangle abcd disposed in the vicinity of each left side of voltage detection wire lead-out parts 13-1 to 13-6, and are located at six locations in total.

<Rectangle abcd>

The rectangle abcd that defines the wire surplus length absorption spaces 11S will be described with reference to an example of the wire surplus length absorption space 11S6.

<<Line ab>>

A line ab is a line that extends from a wall surface 13W6 of the voltage detection wire lead-out part 13-6 on the connector side (left side in the drawing) toward the voltage detection wire housing part 11 in a direction perpendicular to an extension direction of an outer wall 11G.

<<Line cd>>

A line cd is a line that extends from a wall surface 13W5 of the voltage detection wire lead-out part 13-5 adjacent to the connector side of the voltage detection wire lead-out part 13-6 on an opposite side of the connector (right side in the drawing) perpendicularly in a direction of the voltage detection wire housing part 11.

<<Side bc>>

A side bc is a segment resulting from cutting the outer wall 11G of the voltage detection wire housing part 11 on the terminal housing chamber part 12 side by the line ab and the line cd.

<<Side ad>>

A side ad is a segment resulting from cutting a wall 11W6 of the wire routing groove facing the side bc by the line ab and the line cd.

The rectangle abcd is formed by the side bc and the side ad defined as described above.

The voltage detection wire is allowed to pass through the wire surplus length absorption space 11S6 configured by the rectangle abcd obtained as described above to absorb the variability of the cut tolerance and the battery pitch.

In the above description, the wire surplus length absorption spaces 11S are exemplified by the wire surplus length absorption space 11S6. The same description is applied to the other wire surplus length absorption spaces 11S1 to 11S5 in principle. That is, each of the wire surplus length absorption spaces 11S1 to 11S5 is located inside of the square formed by the side bc and the side ad. The side bc and the side ad are a section (side bc) of the outer wall 11G of the voltage detection wire housing part 11 on the terminal housing chamber part 12 side, which is cut by the line ab extended from each connector side wall surface of the voltage detection wire lead-out parts 13-1 to 13-5 perpendicularly in the direction of the voltage detection wire housing part 11, and the line cd extended from a wall surface opposite to the connector side of the wire lead-out part adjacent to the connector side of the wire lead-out part perpendicularly in the direction of the voltage detection wire housing part 11, and a section (side ad) of the wall 11W6 of the wire routing groove facing the side bc. Since the voltage detection wire is routed so as to pass through each of the wire surplus length absorption spaces 11S1 to 11S5, the variability of the cut tolerance and the battery pitch is absorbed by the wire surplus length absorption spaces 11S1 to 11S5.

The wire surplus length absorption spaces 11S are used as follows. First, the connector fitted to the other ends of the voltage detection wires W is fixed to a jig, and the voltage detection wires W are routed from the connector side. If there is the surplus length of the voltage detection wires W, the surplus length can be bent and housed in the wire surplus length absorption spaces 11S.

Figure 4:
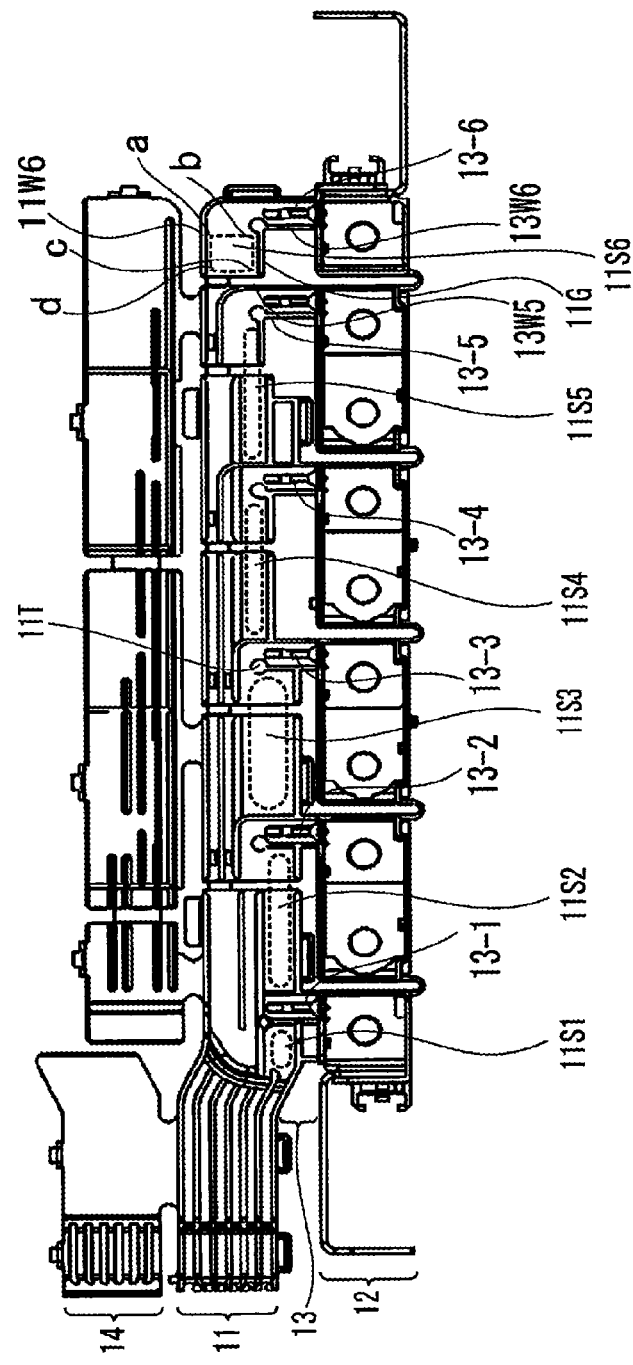
FIG. 4 is a plan view of the wire routing device for illustrating a wire surplus length absorption space according to the present disclosure.
Figure 5:
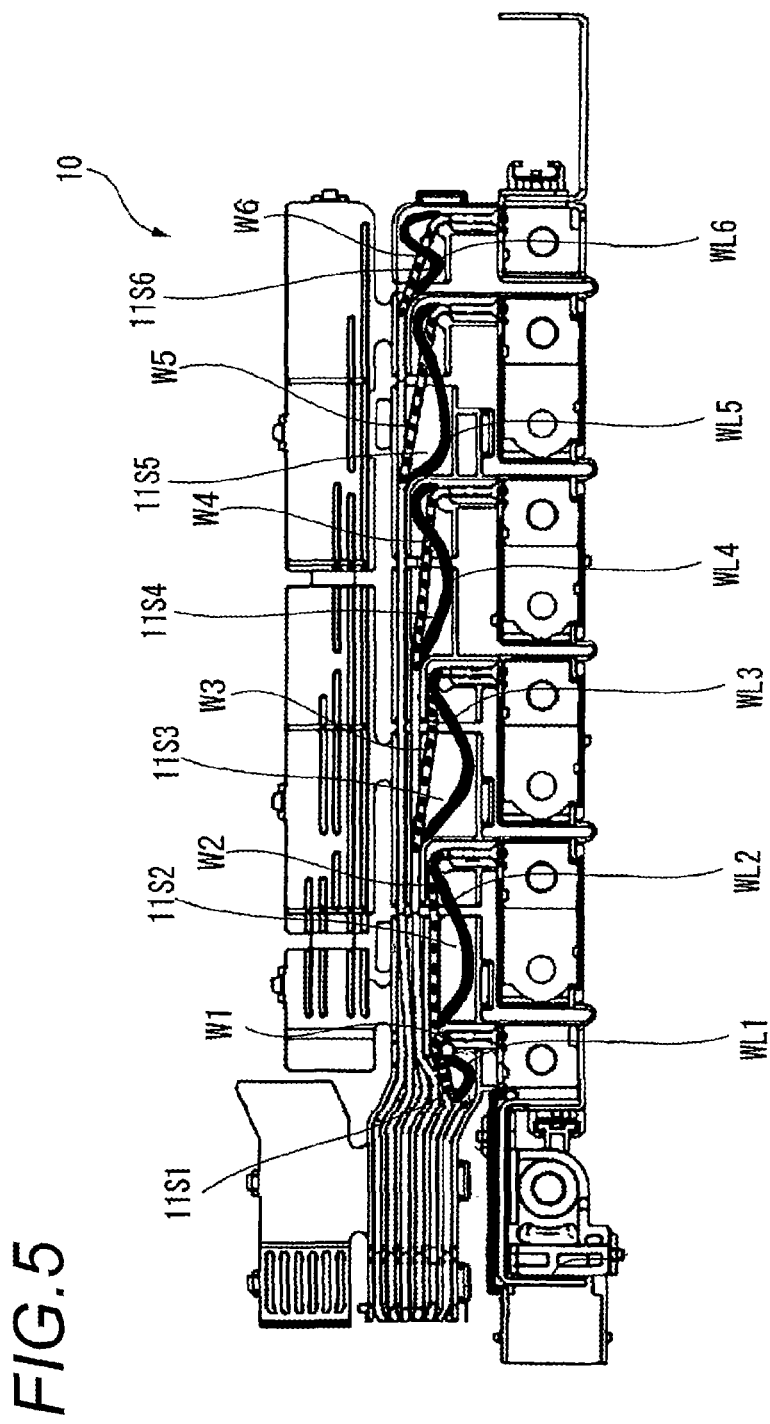
FIG. 5 is a plan view of the wire routing device illustrating two ways of an electric wire that is routed through the shortest route without any surplus length, and an electric wire that is routed with a loosened surplus length, within the wire surplus length absorption space of FIG. 4.

FIG. 5 illustrating two ways of (1) the electric wire that is routed through the shortest route without any surplus length, and (2) the electric wire that is routed with a loosened surplus length, within the wire surplus length absorption spaces of FIG. 4.

Referring to FIG. 5, electric wires W1 to W6 routed in the shortest route in the item (1) are indicated by black and white striped lines, and electric wires WL1 to WL6 routed while being loosened in the item (2) are indicated by black thick lines. Reference numerals 1 to 6 denote the electric wires housed in the wire surplus length absorption spaces 11S1 to 11S6 in FIG. 4, respectively.

For example, when the wire surplus length absorption space 11S3 (FIG. 4) is viewed, the electric wire W3 (FIG. 5) that passes through the wire surplus length absorption space 11S3 by the shortest distance turns from the voltage detection wire lead-out part 13-3 (FIG. 4) by a round protrusion 11T, and then linearly passes through the wire surplus length absorption space 11S3 up to the wire routing groove of the terminal housing chamber part 12. On the contrary, the electric wire WL3 with the surplus length (FIG. 5) turns from the voltage detection wire lead-out part 13-3 by the round protrusion 11T, and then passes through the wire surplus length absorption space 11S3 up to the wire routing groove of the terminal housing chamber part 12 while being largely loosened. A difference between the loosened electric wire WL3 and the electric wire W3 having the shortest distance is the surplus length, and the surplus length is absorbed by the wire surplus length absorption space 11S provided according to the present disclosure.

Since the voltage detection wires W are thus arranged to pass through the wire surplus length absorption spaces 11S, the variability of the cut tolerance and the battery pitch are absorbed by the wire surplus length absorption spaces 11S.

The above description of the electric wire W3 and the electric wire WL3 which pass through the wire surplus length absorption space 11S3 is similarly applied to the other wire surplus length absorption spaces 11S, 11S2, and 11S4 to 11S6.

<Feature 2 of the Present Disclosure: Round Protrusion Erected in the Vicinity of Voltage Detection Terminal Crimping Portion>

Figure 6:
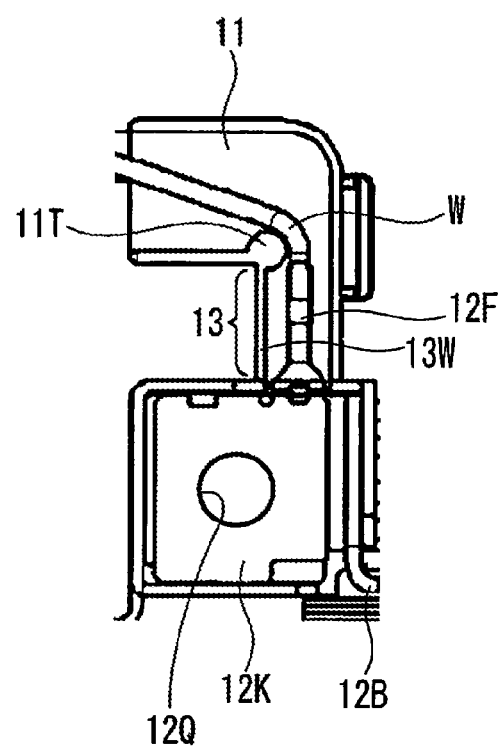
FIG. 6 is an enlarged plan view illustrating a vicinity of a round protrusion in the wire routing device of FIG. 2A.
Figure 7A:
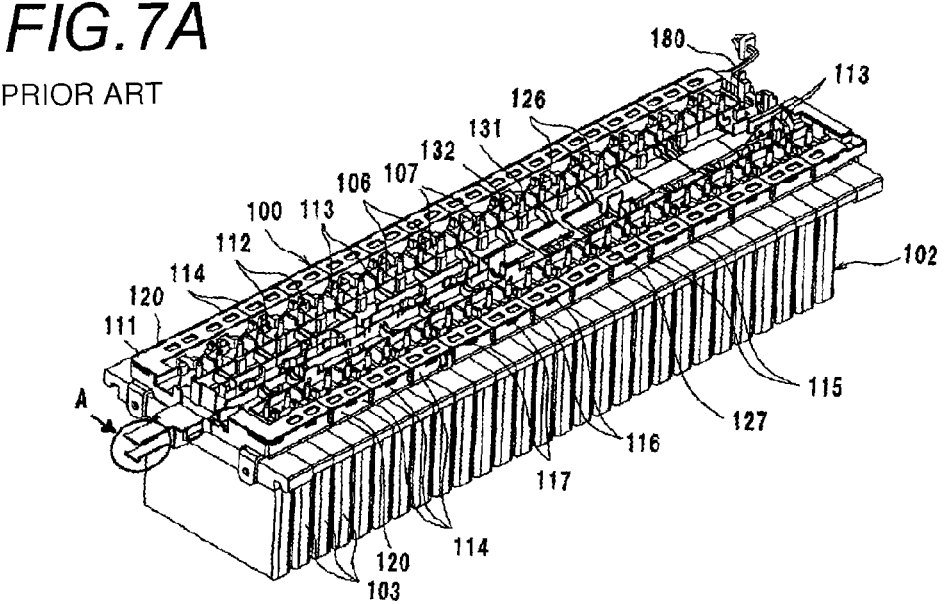
Figure 7B:
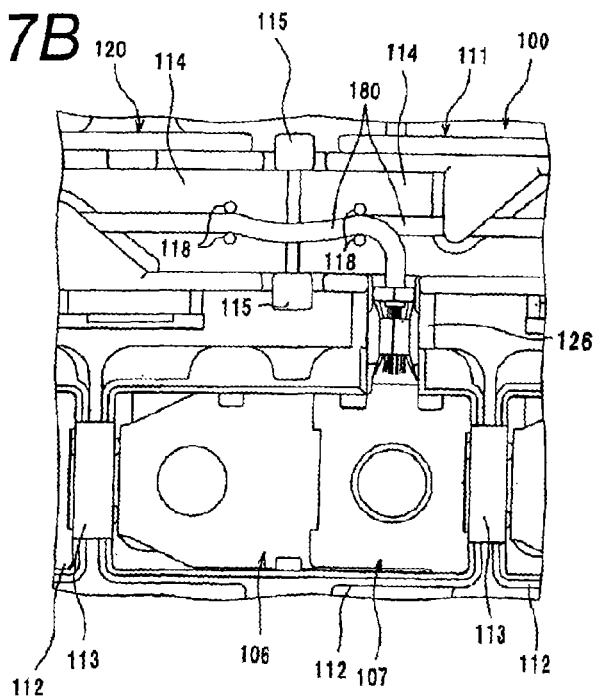

FIG. 6 is an enlarged plan view illustrating a vicinity of a round protrusion according to a feature 2 of the present disclosure, in which a crimping portion 12F is formed on the voltage detection wire lead-out part 13 side of the voltage detection terminal 12K. The end of each voltage detection wire W is swaged to the crimping portion 12F to electrically and mechanically connect the voltage detection terminal 12K and the voltage detection wire W.

In the related technique disclosed in JP-A-2011-70846, since the crimping portion of the voltage detection terminal is pushed against the resin wall, there is a risk that the crimping portion is deformed. On the contrary, the present disclosure has such a feature that the round protrusion 11T is erected at a region which is located at a tip of a wall surface 13W forming the wire lead-out part 13 and farther than the crimping portion 12F. With the above configuration, the crimping portion 12F is not abutted against the round protrusion 11T, and the voltage detection wire W is abutted against the round protrusion 11T. As a result, the crimping portion without any flexibility can be prevented from being pushed against the resin wall and deformed. Also, each voltage detection wire W has the flexibility, and is abutted against a rounded part of the round protrusion 11T, resulting in no risk that the voltage detection wires W are damaged.

CONCLUSION

As has been described above, according to the present disclosure, each voltage detection terminal is fitted in the housing part, the connector fitted to the other end of the electric wire is fixed to the jig, the electric wire is routed from the connector side, the surplus length is bent and housed in the wire surplus length absorption space, and the cover fitted to the resin plate is closed to protect the electric wire.

Because the electric wires are routed from the connection side after the position of the connector has been determined, the dimension of the electric wire extended to the outside of the busbar plate can be stabilized even in the layout where the electric wires cannot be fixed by a tape or a band.

Also, because only one routing space is provided for each electric wire, the surplus length absorption work is simplified.

Further, since the surplus length absorption space is disposed on the voltage detection terminal side of the wire routing groove, the surplus length of the electric wire is easily understood, and the absorption work is simplified.

Further, since the round protrusion abutted against the electric wire is disposed in the vicinity of the voltage detection terminal side crimping portion, the crimping portion can be prevented from being pushed against the crimping portion resin wall of the voltage detection terminal, and deformed.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japanese Patent Application No. 2011-149378 filed on Jul. 5, 2011, the contents of which are incorporated herein by reference.

What is claimed is:

1. A wire routing device for routing wires, and comprising: a wire housing part; a terminal housing chamber part; and a plurality of wire lead-out parts, wherein the wire housing part, the terminal housing chamber part and wire lead-out parts are made of insulative material; wherein the wire housing part includes a plurality of housing grooves, each of the housing grooves is formed between two elongated walls erected at an interval, the wire housing part is divided at a plurality of places in an extending direction of the wire housing part, and respective ends of the divided housing grooves are coupled with each other by elastic coupling members; wherein the terminal housing chamber part includes a plurality of terminal housing chambers which are arranged in a first direction, the terminal housing chambers are coupled with each other by elastic coupling members; wherein each of the terminal housing chambers houses an electrically conductive metal plate which connects a positive terminal of a battery to a negative terminal of an adjacent battery adjacent to the battery; wherein each of the wire lead-out parts couples one of the housing grooves with one of the terminal housing chambers and has a right side wall and left side wall to lead out a voltage detection wire connected to a voltage detection terminal in the terminal housing chamber to the corresponding housing groove;

wherein the wire housing part has a plurality of wire surplus length absorption spaces; wherein each of the wire surplus length absorption spaces is formed inside of a substantially rectangular space abcd defined by a section bc of an outer wall of the voltage detection wire housing part located at a side of the terminal housing chamber and a section ad of a wall of the housing groove which faces the section bc, which are cut by a line ab extending from the left side wall of the wire lead-out part in a second direction perpendicular to the first direction, and a line cd extending from a right side wall of a wire lead-out part corresponding to a terminal housing chamber which is adjacent to left side of the terminal chamber corresponding to the wire lead-out part in the second direction; and wherein at least one of the wires has a surplus portion which is stored in an associated one of the wire surplus length absorption spaces; wherein adjacent housing grooves are arranged one on top of the other in the second direction such that adjacent housing grooves share at least one elongated wall extending in the extending direction.

2. The wire routing device according to claim 1, wherein a crimping portion is formed so as to be extended from a part of the voltage detection terminal, and an end of the voltage detection wire is crimped by the crimping portion; and wherein a round protrusion is provided at a region which is located at a tip end of one of the two elongated walls forming the wire lead-out part and located farther from the terminal housing chamber than the crimping portion.

3. The wire routing device according to claim 1, wherein the surplus portion is loosely stored.

4. The wire routing device according to claim 1, wherein the wire housing part is configured to lead the wires out of a terminal opening of the wire housing part in the second direction.

5. The wire routing device according to claim 1, wherein each of the surplus length absorption spaces is configured to house a surplus length of only a single wire respectively.

* * * * *